США009916345B1

United States Patent
Makadia et al.

(10) Patent No.: US 9,916,345 B1
(45) Date of Patent: Mar. 13, 2018

(54) SEARCHING THREE-DIMENSIONAL (3D) OBJECT DATA MODELS

(71) Applicant: Google Inc., Mountain View, CA (US)

(72) Inventors: Ameesh Makadia, Mountain View, CA (US); Andrew Logan Harp, Mountain View, CA (US); Anthony Gerald Francis, Mountain View, CA (US); David Kogan, Mountain View, CA (US); Diego Ariel Gertzenstein, Mountain View, CA (US); Arthur Edmond Blume, Mountain View, CA (US); Rachel Lara Petterson, Mountain View, CA (US); Evangelos Kokkevis, Mountain View, CA (US); Won Suk Chun, Mountain View, CA (US); Ehud Rivlin, Mountain View, CA (US)

(73) Assignee: Google LLC, Mountain View, CA (US)

(*) Notice: Subject to any disclaimer, the term of this patent is extended or adjusted under 35 U.S.C. 154(b) by 374 days.

(21) Appl. No.: 14/619,709

(22) Filed: Feb. 11, 2015

Related U.S. Application Data

(60) Provisional application No. 61/939,107, filed on Feb. 12, 2014.

(51) Int. Cl.
*G06F 7/00* (2006.01)
*G06F 17/30* (2006.01)

(52) U.S. Cl.
CPC .. *G06F 17/30386* (2013.01); *G06F 17/30265* (2013.01)

(58) Field of Classification Search
CPC ......... G06F 17/30386; G06F 17/30265; G06F 17/30256; G06F 17/30247; G06F 17/30994; G06F 17/30864
See application file for complete search history.

(56) References Cited

U.S. PATENT DOCUMENTS

| 6,016,487 A * | 1/2000 | Rioux | G06F 17/3025 707/743 |
| 2015/0169636 A1* | 6/2015 | Ovsjanikovs | G06F 17/30256 707/722 |

OTHER PUBLICATIONS

Funkhouser et al., "A Search Engine for 3D Models", ACM Transactions on Graphics, vol. 22, No. 1, Jan. 2003, pp. 83-105.
Knowledge Center, "Finding and downloading models from the 3D Warehouse into SketchUp", retrieved from http://help.sketchup.com/en/article/37936 on Feb. 10, 2014.
Knowledge Center, "Advanced Search Operators", retrieved from http://help.sketchup.com/en/article/92457 on Feb. 10, 2014.
Knowledge Center, 3D Warehouse User Interface, retrieved from http://help.sketchup.com/en/article/164181 on Feb. 10, 2014.

* cited by examiner

*Primary Examiner* — Tuan A Pham
*Assistant Examiner* — Thai V Dang
(74) *Attorney, Agent, or Firm* — McDonnell Boehnen Hulbert & Berghoff LLP

(57) ABSTRACT

Methods and systems for interacting with multiple three-dimensional (3D) object data models are provided. An example method may involve receiving a search query comprising a descriptor for an object that is associated with a given category of objects. The method may involve comparing the descriptor to contents of a three-dimensional (3D) object-data-model database that includes contents associated with the given category of objects. Based on the comparison, the method may involve generating a search query result that comprises 3D object data models that describe the object and associated images that describe the object. The method may also involve arranging the 3D object data models and associated images in the search query result in a manner such that the 3D object data models are moveable inline in the search query result, and providing the search query result.

18 Claims, 9 Drawing Sheets

SEARCHING THREE-DIMENSIONAL (3D) OBJECT DATA MODELS

CROSS-REFERENCE TO RELATED APPLICATION

This application claims priority to U.S. provisional patent application No. 61/939,107 filed on Feb. 12, 2014, the entire contents of which are herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics. 3D models are used in a wide variety of fields, and may be displayed using a number of different types of interfaces. Example interfaces may provide functionality to enable interaction between a user and the 3D models.

SUMMARY

Disclosed embodiments generally relate to detecting and annotating parts of three-dimensional (3D) object data models. Once annotated, searches may be performed on the 3D object data models. More specifically, disclosed embodiments may allow for detecting and annotating particular parts of 3D object data models based on example 3D object data models that include the particular parts. For example, given a model of a digital camera having a lens, flash, and display, methods and systems described herein may be used to automatically detect and annotate parts of candidate 3D object data models that correspond to the lens, flash, and display. After annotation, the 3D object data models may be indexed in a database allowing for searches to be performed on the 3D object data models based on the annotated parts.

In one example aspect, a method is provided. The method may involve receiving, at a server, a search query comprising at least one descriptor for an object. The object may be associated with a given category of objects. The method may also involve comparing the at least one descriptor to contents of a three-dimensional (3D) object-data-model database. The contents of the 3D object-data-model database may include contents associated with the given category of objects. The method may additionally involve, based on the comparison, generating, at the server, a search query result that comprises 3D object data models that describe the object and associated images that describe the object. The method may further involve arranging the 3D object data models and associated images in the search query result in a manner such that the 3D object data models are moveable inline in the search query result. The method may still further involve providing, by the server, the search query result.

In another example aspect, a computer-readable medium having stored therein instructions that, when executed by a computing device, cause the computing device to perform functions is provided. The functions may include receiving, at a server, a search query comprising at least one descriptor for an object. The object may be associated with a given category of objects. The functions may also include comparing the at least one descriptor to contents of a three-dimensional (3D) object-data-model database. The contents of the 3D object-data-model database may include contents associated with the given category of objects. The functions may additionally include, based on the comparison, generating a search query result that comprises 3D object data models that describe the object and associated images that describe the object. The functions may further include arranging the 3D object data models and associated images in the search query result in a manner such that the 3D object data models are moveable inline in the search query result. The functions may still further include providing the search query result.

In still another example aspect, a server is provided that includes a processor, a non-transitory computer readable medium, and instructions stored in the non-transitory computer readable medium, the instructions executable by the processor to cause the server to perform functions. The functions may include receiving, at a server, a search query comprising at least one descriptor for an object. The object may be associated with a given category of objects. The functions may also include comparing the at least one descriptor to contents of a three-dimensional (3D) object-data-model database. The functions may additionally involve, based on the comparison, generating a search query result that comprises 3D object data models that describe the object and associated images that describe the object. The functions may further involve arranging the 3D object data models and associated images in the search query result in a manner such that the 3D object data models are moveable inline in the search query result. The functions may still further involve providing, by the server, the search query result.

In yet another example aspect, another system is provided. The system may include a means for receiving a search query comprising at least one descriptor for an object. The object may be associated with a given category of objects. The system may also include a means for comparing the at least one descriptor to contents of a three-dimensional (3D) object-data-model database. The contents of the 3D object-data-model database may include contents associated with the given category of objects. The system may additionally include a means for based on the comparison, generating, at the server, a search query result that comprises 3D object data models that describe the object and associated images that describe the object. The system may additionally include a means for arranging the 3D object data models and associated images in the search query result in a manner such that the 3D object data models are moveable inline in the search query result. The system may additionally include a means for providing, by the server, the search query result.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
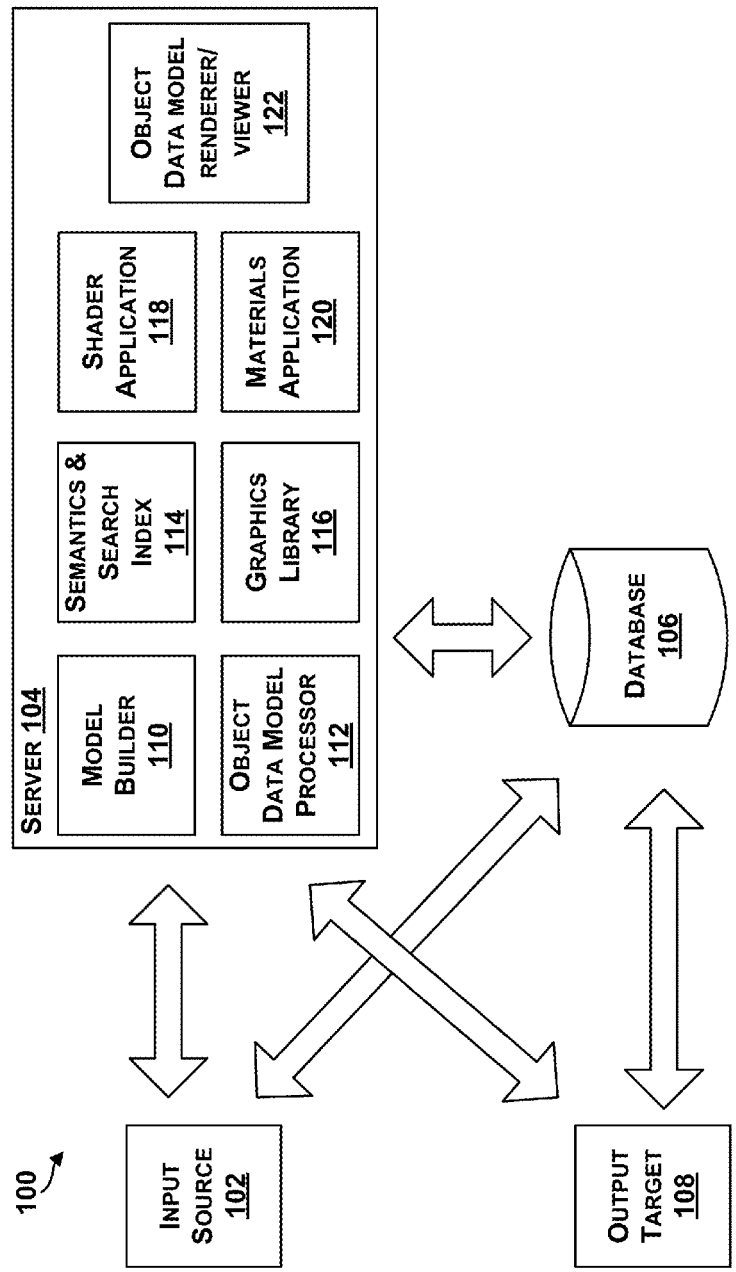
FIG. 1 illustrates an example system for object data modeling, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

This disclosure may disclose, inter alia, methods and systems for applying annotations to three-dimensional (3D) object data models that describe an object. Annotated 3D object data models that describe an object in a given category can be generated or received and applied to other 3D object data models that represent objects in the given category. The annotated templates may include annotations for different parts of the objet. In some instances, the annotation may be applied as a call-out that is associated with the particular part of the object (e.g., to provide labels or information associated with the particular part of the object). Optionally, the call-out may be or include name and model information associated with the part. The annotated 3D template may be used to identify corresponding parts in other 3D object data models in the given category for placement of call-outs.

For example, for any category of interest such as digital cameras, a set of desired parts such as lens, flash, display, power button, etc., and example 3D models with these desired parts may be received. Using this information, a model may be generated corresponding to each part by observing shapes and appearances of that part across all its occurrences in the set. Additionally, spatial-layout information that corresponds to a single model of the digital camera may be determined based on how the parts are arranged in the set (e.g., the camera "lens" and "display" may always be located far from each other on the model). Once the part models and spatial-layout information has been determined, any model belonging to the same category may have its parts annotated, and thereafter may be indexed in a database with such annotations. Additionally, individual 3D models corresponding to the various parts may be generated and indexed. Once indexed, the models may be searched based on shape and appearance as well as associated spatial-layout information. Thus, given example 3D object data models with particular annotated parts for a given category of objects, other candidate 3D object data models may automatically automatic have their parts labeled.

Once indexed, the annotated 3D object data models may be searched using images(s), partial 3D object data models, or complete 3D object data models as queries. For querying by images, the images may be matched to rendered views of the index models, and for querying my 3D object data models, the shape and appearance information may be used to match queries to index models. Upon finding a match a search result query may be returned that includes similar 3D object data models and images in a manner in which the results are directly interactable.

Example Systems

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with vendors or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining dense surface mesh geometry, and may generate an combined model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. In one example, an annotation may be provided to label a particular part of a 3D object data model and may provide any type of information relevant to that part. Annotations may be performed manually or automatically.

In examples herein, an annotated 3D object data model of an object in a given classification or category may be generated that includes annotations to particular parts. Based on shape, appearance, and layout information associated with the annotations to the annotated 3D object model, annotations may be applied to other candidate 3D object data models that describe objects in the given classification or category. For example, the semantics and search index 114 may include an extracting component, annotation component, and matching component. Each of the components may take the form of a processor configured to execute instructions to perform functions. As an example, the extracting component may be coupled to a database including annotated 3D object data models that are associated with a given category of objects. The extracting component may be configured to process shape and appearance information of one or more parts of the annotated 3D object data models and extract spatial-layout information that defines how the one or more parts of the annotated 3D object data models are spatially arranged. Working with model builder 110, extracting component may utilize the shape and appearance information and the spatial-layout information to generate a plurality of 3D object data models that correspond to the one or more parts of the annotated 3D object data models. As another example, the annotation component may be coupled to the extrapolating component (and/or the database) and may be configured to receive a candidate 3D object data model that is associated with the given category. The candidate 3D object data model may include un-annotated parts. Based on the spatial-layout information and the plurality of 3D object data models, the annotation component may automatically annotate the candidate 3D object data model such that at least one of the un-annotated parts is annotated.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to provide part annotations for a 3D object data model based on part models and spatial structure learned from other annotated 3D object data models that define an object in the same category.

Example Processes

Figure 2A:
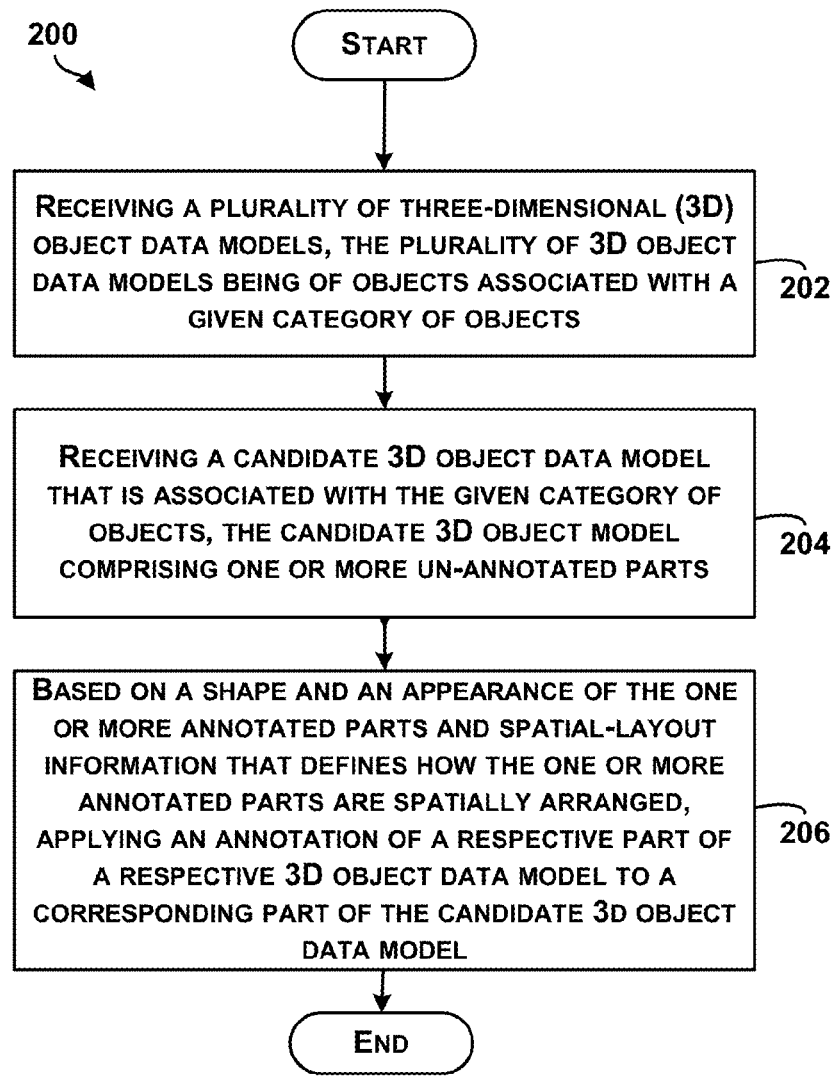
FIG. 2A is a block diagram of an example method for applying part annotations to a candidate three-dimensional (3D) object data model, according to an example embodiment.

FIG. 2A is a block diagram of an example method 200 for applying part annotations for three-dimensional (3D) object data models. Method 200 shown in FIG. 2A presents an embodiment of a method that could be used by the system 100 of FIG. 1 or components of the system 100, for example. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2A may represent circuitry that is wired to perform the specific logical functions in the process.

Initially, at block 202, the method 200 includes receiving a plurality of three-dimensional (3D) object data models. A server or computing device may receive the plurality of 3D object data models from a number of sources, such as an input by a user or 3D models stored in a database. The plurality of 3D object data models may each describe an object associated with a given category of objects, and the 3D object data models may each include one or more annotated parts that correspond to one or more parts of the object that is described by particular 3D object data model. As an example, a user may manually identify and annotate parts of a 3D object data model of a shoe (e.g., a front, sole, heel, laces, etc.), and the annotated 3D object data model may be assigned to a general category of shoes. In a further example, individual categories of shoes may include annotated models. For instance, categories of shoes such as running shoes, men's shoes, women's shoes, sandals, etc. may include 3D models with particular parts annotated.

In some examples, the 3D object data models with annotations of particular parts may be manually created by a user as a reference model or training model for the placement of part annotations on other candidate 3D object data models that describe objects within the given category, but that have un-annotated parts. In other examples, a database may store training 3D object data models with part annotations for multiple categories (or classifications) of objects, and training 3D object data models may be received from the database based on information identifying a given category for a candidate 3D object data model that is to be annotated.

As noted above, the received 3D object data models may include one or more annotated parts. The one or more parts of the 3D object data models may correspond to one or more parts of one or more objects described by the 3D object models. For instance, in the example in which the annotated 3D object model describes a shoe, as noted above, the one or more parts may include a front, a sole, a heel, a lace, etc. The annotations to each part may be applied at a vertex position of that part and may identify attributes relevant to the particular part (e.g., name of the part, color of the part, texture of the part, model number of the part, etc.).

At block 204, method 200 includes receiving a candidate 3D object data model that is associated with the given category of objects. The candidate 3D object data model may include one or more un-annotated parts. As an example, the candidate 3D object data model may be a men's shoe, and thus may fit with in the given category of shoes. The candidate 3D object data model may be received in the same manner or the same way as the plurality of 3D object data models are received at block 202. For instance, the candidate 3D object data model may be received from input by a user or from a database.

In some examples, the category of objects the candidate 3D object data model is associated with may be unknown when received. In such cases, a matching component may be used to compare the one or more parts of the candidate 3D object data model to the various part models. To make the comparison, object data model processor 112 may employ the shape comparison methods and techniques described below. Based on the comparison, it may be determined what category the candidate 3D object data model belongs to, and if within the given category of the received 3D object data models, the candidate 3D object model may be annotated accordingly.

At block 206, the method 200 includes based on a shape an appearance of the one or more annotated parts and spatial-layout information that defines how the one or more annotated parts are spatially arranged, applying an annotation of a respective part of a respective 3D object data model to a corresponding part of the candidate 3D object data model.

The shape and appearance of the one or more annotated parts may be determined by generating a second plurality of 3D object data models (hereinafter 3D part models) that correspond to the one or more annotated parts of the 3D object data models received at block 202. In other words, each model in the second plurality of 3D object data models may represent an individual part that corresponds to one of the annotated parts on the received 3D object data models. Referring to the shoe example noted above, for example, shape and appearance information may be obtained for the parts including: front, sole, heel, and laces. The object data model processor 112 may work, for example, with model builder 110 to generate the new 3D object data models. Once the 3D part models have been generated, using the extracting component, shape and appearance information of the relevant parts of the training 3D object data models may be obtained from the newly generated models. Such information may include position matrices, transformation matrices, rotational matrices, boundary representations, volume, etc.

In some examples, the shape and appearance of the one or more annotated parts may be determined without generating a new set of 3D object data models and may instead be represented using a different data structure such as a graphical model, for example. Any data structure may be used to encapsulate the shape and appearance of the one or more annotated parts.

Generally, the spatial-layout information may be determined by observing how parts are arranged on the 3D object data models received at block 202. For example, again referring to the shoe example, when processing a given 3D object data model belonging to the shoe category, object data model processor 112 may determine that a part corresponding to a shoe lace is on the front of the given 3D model. Processing the remaining 3D object data models, object data model processor 112 may determine that the shoe lace is generally on the front of all shoe models. The spatial-layout information may include similar information and/or any information that may describe how parts are arranged on the received 3D object data models. Such information may include normalized geodesic distances between given parts on a given 3D object data model (e.g., the distance between two vertices on two given parts of the given 3D object data model) and information regarding the relative surface orientation between parts on the given 3D object data model (e.g., an estimation of the angle at which parts may meet), for example.

In other examples, to determine the spatial-layout information, the received 3D object data models may first be converted and represented as graphical network models and then the spatial-layout information may be obtained based on the graphical representation of the 3D object data models. For example, a given 3D object data model may be processed by object data model processor 112 and thereafter represented as a Bayesian network or Markov random field. A Bayesian network (or Bayes network, belief network, Bayes(ian) model, or probabilistic directed acyclic graphical model) is a probabilistic graphical model (a type of statistical model) that represents a set of random variables and their conditional dependencies via a directed acyclic graph (DAG). Similarly, a Markov random field is a set of random variables having a Markov property described by an undirected graph. A Markov random field is similar to a Bayesian network in its representation of dependencies; the difference being that a Bayesian network is directed and acyclic, whereas Markov networks are undirected and may be cyclic. In other words, a Markov network can represent cyclic dependencies (a relation between two or more modules which either directly or indirectly depend on each other to function properly) but a Bayesian network cannot.

Accordingly, converting the given 3D object data models into Bayesian network or Markov random fields may represent the probabilistic relationships between the given 3D object data model and its parts. Each node in the graphical model may, for example, represent a part on the given 3D object model.

Regardless of the graphical model chosen to represent the 3D object data model, upon obtaining the graphical model, inferences may be determined using Belief propagation. Also known as sum-product message passing, Belief propagation is a message passing algorithm for performing inferences on graphical models, such as the Bayesian networks and Markov random fields described above. Using Belief propagation, the marginal distribution for each unobserved node, conditional on any observed nodes, may be calculated. Accordingly, given a graphical model of the 3D objet data models in which the nodes represent parts, using Belief propagation, object data model processor 112 may utilize any known nodes in the graphical model to infer the location of other parts. Once performed for all parts on a given 3D object data model, the spatial-layout information may be obtained and stored in database 106.

In some examples, determining the spatial-layout information may be may be performed by a shape-extracting server (e.g., an extracting component having a processor and a memory), and a server performing the method 200 may receive from the shape-extracting server, information indicating the spatial-layout information. Thus, portions of the functions of block 206 may be performed by a given entity and outputs may be provided to an entity that performs the method 200, for example.

Using the shape and appearance of the one or more annotated parts and the spatial layout information, an annotation may be applied to the candidate 3D object data model. This may be achieved for example by comparing, using the matching component of semantics and search index 114, the plurality of 3D part models and the spatial-layout information to the candidate 3D object data model received at block 208 to determine similarities between shapes on the candidate 3D object data model and the plurality of 3D part models that represent the individual shapes. Each model of the plurality of 3D part models and the spatial-layout information may be compared (or matched) to the 3D model using the matching component. In other words, the plurality of 3D art models may be used along with the spatial-layout information generated to determine if and where similar shapes are on the candidate 3D object data model. If it is determined that similar shapes exist in an appropriate location, the method may assume the shape corresponds to a particular part and may annotate the candidate 3D object data model accordingly.

Many methods and techniques exist for comparing each 3D object data model of the second plurality of 3D object data models to the candidate 3D object data model. Known as shape matching, generally there are two main categories of approaches for shape matching: matching by feature correspondences and matching by global descriptors. The former approach may involve computing multiple local shape features for every model and assessing the similarity of any pair of models by optimizing a cost function determined by the optimal set of feature correspondences at the optimal relative transformation. The global descriptor-based approach may involve mapping from the space of 3D objects to some finite-dimensional vector space. The vector may encode the information about the shape of the object by storing a vector of numerical attributes for each 3D model in the database as a representation, known as shape descriptors, which usually are high-dimensional vectors. When a query as to whether two models are the shape is presented, the matching component may calculate its descriptor(s) and compare it to all of the stored descriptors using a distance function. After the distance function measures the dissimilarity between the query and all of the models in the database, the engine may sort database models in terms of increasing distance values.

In one example, a surface simplification algorithm may be used to compare the second plurality of 3D object data models to the candidate 3D object data model in attempt to produce an approximation of the parts on the 3D object data model. Generally known, the algorithm uses iterative contractions of vertex pairs to simplify models and maintain surface error approximation using quadric matrices. In another example, spin image representations of the second plurality of 3D object data models may be used to recognize the one or more parts of the 3D object data model. The recognition is performed based on matching surfaces by matching points using spin image representation. The spin image is a data level shape descriptor that is used to match surfaces represented as surface meshes.

In another example, 2D shape contexts may be used to measure the similarity between two shapes, or in this case measure the similarity between each model of the second plurality of 3D object data models and the candidate 3D object data model. Some methods may determine shape similarity by, solving for correspondences between points on two shapes, and using the correspondences to estimate an aligning transform. A shape-context descriptor may be attached to each point that captures the distribution of the remaining points relative to it, thus offering a globally discriminative characterization. Because corresponding points on two similar shapes will have similar shape contexts, correspondences between the shapes can be determined. Given the point correspondences, a transformation that best aligns the two shapes may be estimated. Then, the dissimilarity between the two shapes may be computed as a sum of matching errors between corresponding points, together with a term measuring the magnitude of the aligning transform.

In further examples herein, any number, type, or combination of shape descriptors may be used for measuring similarity between 3D shapes. Examples may include curvature features, principal component analysis (PCA) features, geodesic distance features, and appearance features to name a few.

Once the 3D part models have each been compared to the candidate 3D object data model, an annotation may be applied to the candidate 3D object model in a manner that annotates each part of the candidate 3D object data model. The annotation may take the form of a call-out that provides the information associated with the part. The annotation may include any information relevant to the particular part on the 3D object data model that is being annotated. For example, the annotation may include a part name or a part model number. Other relevant information may be included in the annotation as well. In some examples, the call-out may facilitate changing an orientation or pose of the 3D object data model. In still other examples, the call-out may include an advertisement.

In one example, the annotation may be performed by an annotation component that receives matching correspondences between the plurality of 3D part models and the candidate 3D object model. Based on the received information, the annotation component may map the annotations to the matching correspondence points of the candidate 3D object data model as call-outs.

In some examples, a received 3D object data model may include more part annotations than may apply for a candidate 3D object data model. For instance, an annotated 3D object data model of a shoe may include annotations to the sole, heel, and laces; however, the candidate 3D object data model of a shoe being compared may not include laces. In such examples, all annotations that may be applied can be assigned, while others can be ignored (e.g., if a matching part is not found on a candidate 3D object data model for a given part of the annotated 3D object data model).

Further, in some examples, once the annotation has been performed, the annotated candidate 3D object data model may be evaluated to determine errors that may be associated with the newly annotated candidate 3D object data model. In some examples, the annotated candidate 3D object data model may be evaluated by a human, and in other examples, by using some other heuristic (such as a particular training 3D object data model with accurate part labeling or a different training or learning algorithm). Upon evaluating the annotations made to the candidate 3D object data model, any errors made can be used to correct the application of further annotations. For example, the errors may be used to alter the spatial-layout information or the shape and appearance information of the one or more parts. Then, for later performed annotations of candidate 3D object data models, the improved candidate 3D object model may be used.

Example Part Annotations

Figure 3:
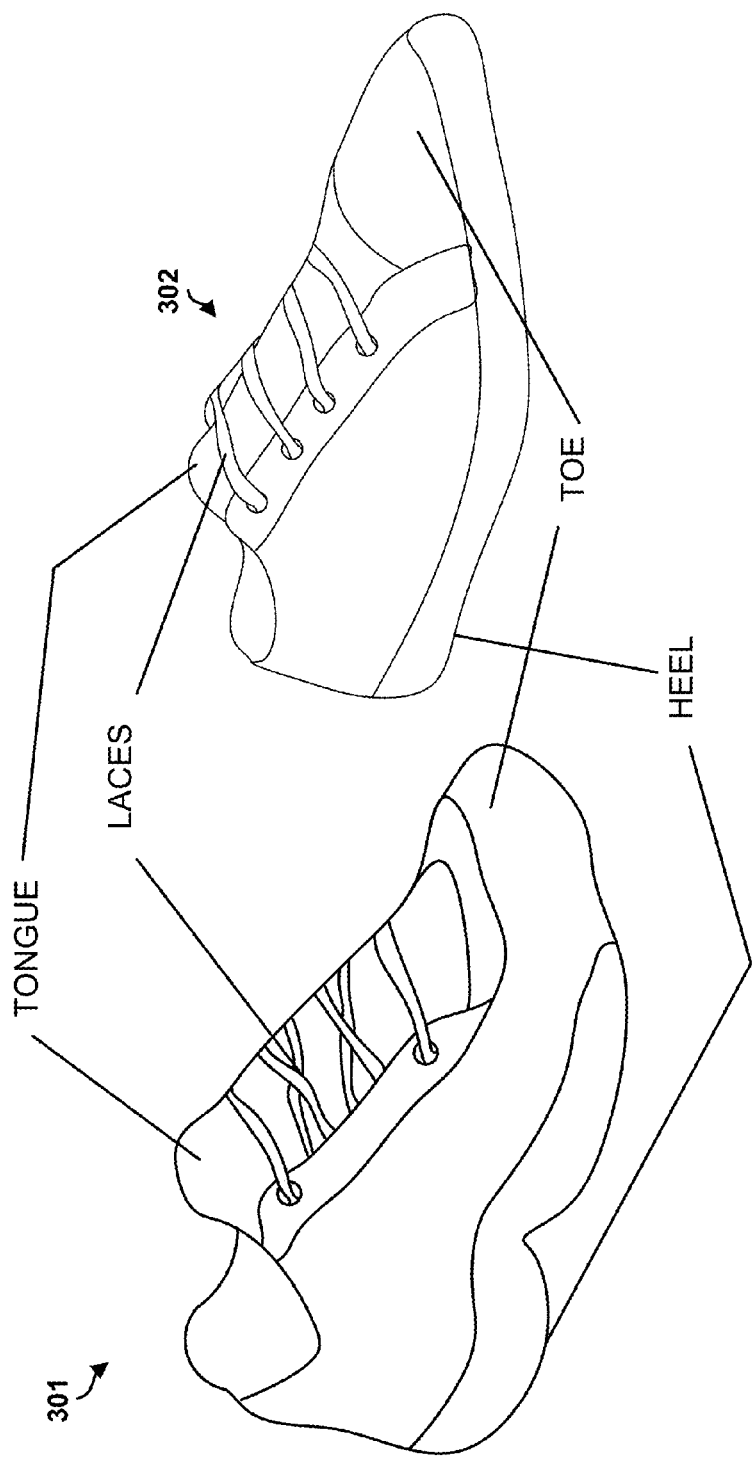
FIG. 3 conceptually illustrates examples of 3D object data models with part annotations, according to an example embodiment.

FIG. 3 conceptually illustrates examples of training 3D object data models 301, 302 with part annotations. As shown in FIG. 3, a first training 3D object data model 301 may be a 3D object data model of an athletic shoe and a second training 3D object data model 302 may be a 3D object data model of a walking/casual shoe. Each of the training 3D object data models 301, 302 may include annotations to four parts of the shoes: a tongue, laces, toe, and heel of each of the shoes.

The annotated 3D object data models 301, 302 are provided as examples of an annotated 3D object data model and are not meant to be limiting. For instance, a 3D object data model may include more or less annotated parts and may be of any size and resolution.

Figure 4A:
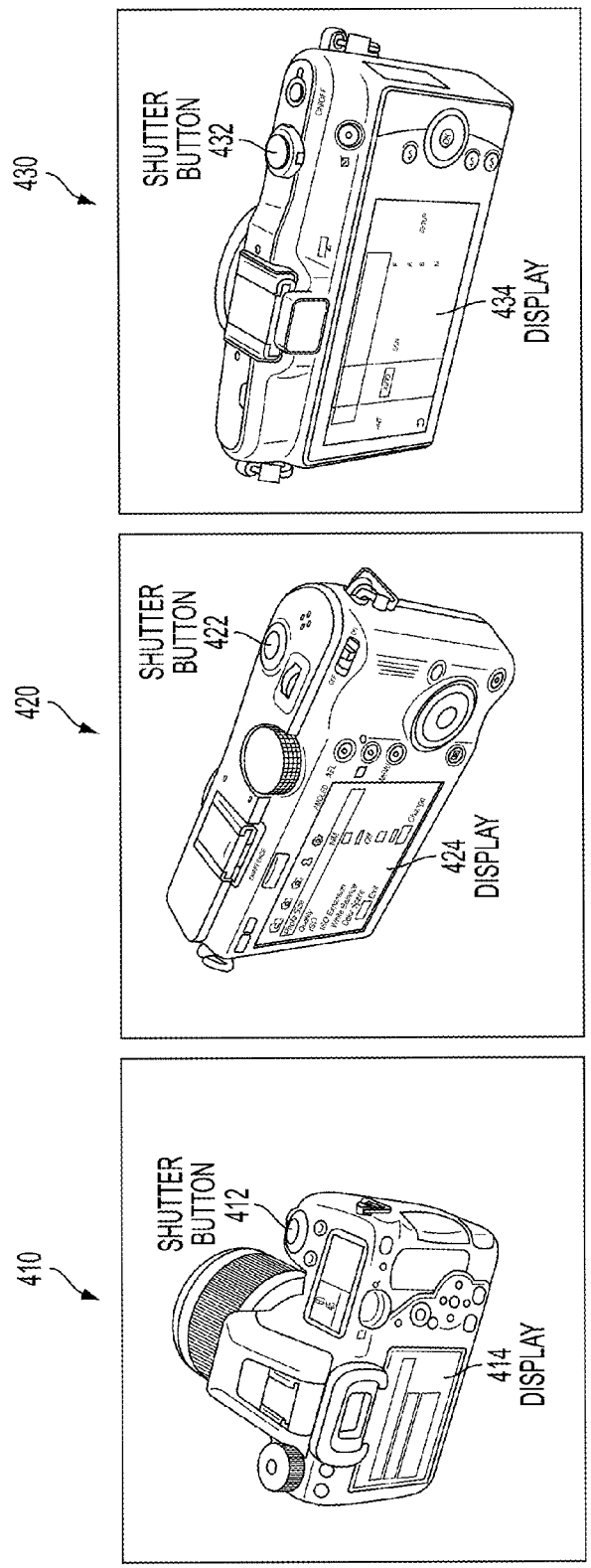
FIGS. 4A and 4B conceptually illustrate examples of applying part annotations to a candidate 3D object data model, according to an example embodiment.
Figure 4B:
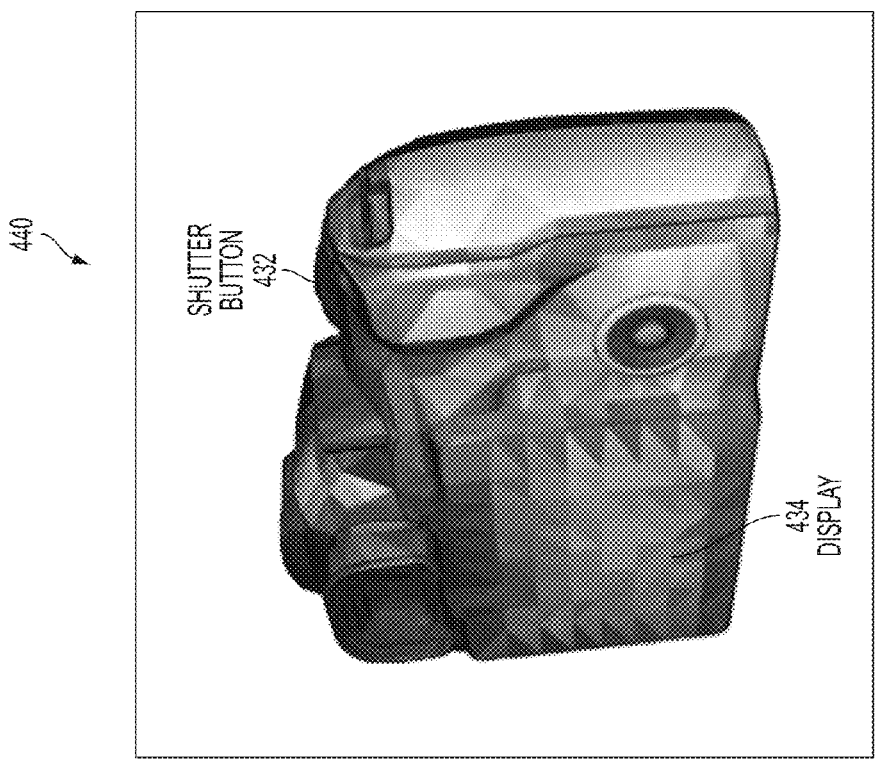

FIGS. 4A and 4B conceptually illustrate examples of applying annotations to a candidate 3D object data model based on representative part models and spatial-layout information such as the part models generated at block 206 and the spatial-layout information determined at step 206 of method 200. FIG. 4A illustrates a plurality of training 3D object data models 410, 420, 430 of various cameras. Accordingly, the category of objects may be cameras. As shown, each training 3D object data model includes two annotations to two parts: the shutter button and the display. As shown, the annotations 412, 414, 422, 424, 432, 434 take the form of a call-out and include information identifying the name of the particular part.

Note, while the examples in FIG. 4A only show two part annotations per model, in other examples more or less parts may be annotated. For example, a lens, eye piece, power button, base etc. may be annotated. Additionally, more information may be included in each annotation.

FIG. 4B illustrates an annotated candidate 3D object data model 440 that belongs to the same category as the template in FIG. 4A—the category of cameras. Thus, the annotations of FIG. 4A may be applied to the candidate 3D object data model of FIG. 4B. Using the shape information and spatial-layout information, the parts on the candidate 3D object data model can be identified, and the annotations from the various training 3D object data models can be applied to the object in FIG. 4B as shown. For example, using the extracting component and matching component, it may be determined that, for 3D models in the camera category, parts corresponding to the display are wide and flat, and parts corresponding to the shutter button are generally located on a plane perpendicular to a plane of the display and positioned up from the display. Using this information, candidate 3D object data model 440 can be annotated accordingly: the display annotation 434 may be applied to a wide flat portion of the candidate 3D object data model 440 and the shutter-button annotation 432 may be applied to a part on a plane perpendicular to the display plane and positioned up from the display.

Note, the spatial-layout information applied in the example conceptually illustrated in FIGS. 4A and 4B are not intended to be limiting. In practice, the spatial-layout information may be vast and complex. Additionally, for annotations of the training 3D object data models that do not find matching parts on the candidate 3D object data model, those annotations may be ignored.

In some examples, several candidate 3D object data models may have been annotated based on method 200 as described above. Using the annotated candidate models, a database may be generated that includes the annoatated models. The database may be the same as or similar to database 106 of server 100, for example. The 3D object data models included in the database may be associated with a given category of objects (e.g., shoes), and once created, the database of 3D object data models may be searched. Upon searching the database, various models may be provided a query search result.

Figure 2B:
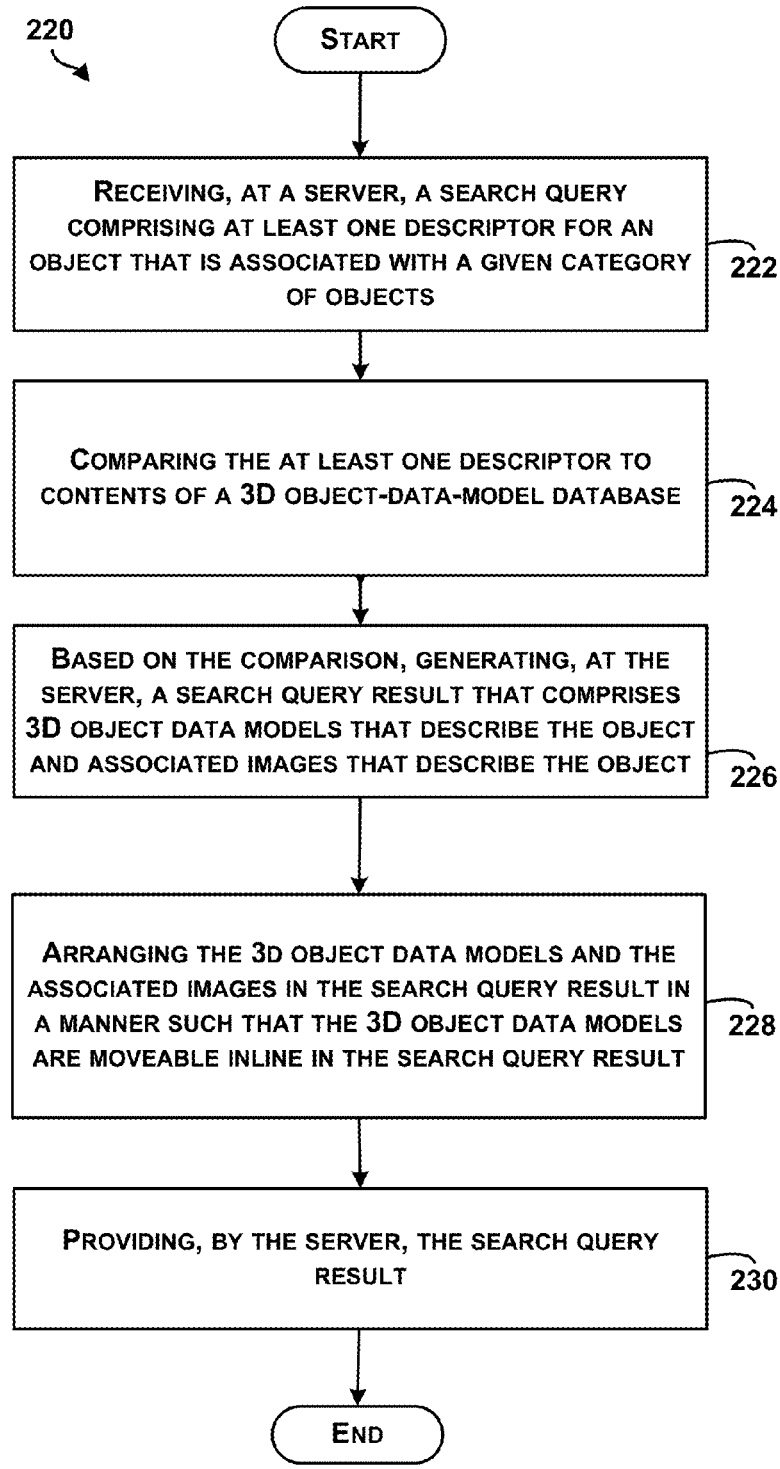
FIG. 2B is a block diagram of an example method for searching for 3D object data models such as the candidate 3D object data model of FIG. 2A, according to an example embodiment.

Method 220 of FIG. 2B is a block diagram of an example method for searching 3D object data models and providing the search result in a search query result. Similar to method 200 of FIG. 2A, method 220 shown in FIG. 2B presents an embodiment of a method that could be used by the system 100 of FIG. 1 or components of the system 100, for example. Method 220 may include one or more operations, functions, or actions as illustrated by one or more of blocks 222-228. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Method 220 starts at block 222 and involves receiving, at a server, a search query including at least one descriptor for an object that is associated with a given category of objects. As noted above, the server may be the same as or similar to that of server 100 described with reference to FIG. 1. The object may be any object of interest to a user of the system, and may be associated with a category of objects. For instance, in examples in which a database is being searched after performing annotation of various objects of a given category of objects, the object may be in the same category as the given category of objects. The search query may be received by processor 112 for example. In some examples, the search query may be received from a client device on a network that may be operating a webpage.

The descriptor may generally be any information that serves to describe the object. In some examples, the descriptor may take the form of metadata or other text data that may describe the object. In other examples, the descriptor may be any portion of interest of the 3D object data models being searched. For example, the descriptor may include a 3D object data model that describes the object, a partial 3D object data model that describes a portion (e.g., a particular part) of the object, or an image of the object. For example, in instances in which the given category of objects is cameras, searches may be performed using descriptors such images of cameras with 4 inch displays. Another example may include using descriptors such as models of cameras with a particular zoom lens. However, these descriptors are examples only and other descriptors are possible.

Once the descriptor has been received, at block 224, method 220 involves comparing the at least one descriptor to contents of a 3D object-data-model database. The 3D object-data-model database may include contents or information associated with the given category of objects. As noted above, the contents or information associated with the given category of objects may include a plurality of 3D object data models that describe the object. For instance, the plurality of 3D object data models may include a variety of annotated 3D object data models (e.g., annotated using method 200) that describe the object or parts of 3D object data models that describe the object. Additionally, the 3D object-data-model database may include corresponding images that describe the object. For instance, the images may include various renderings of the various 3D object data models and/or renderings of the parts of 3D object data models. Other relevant information may be included in the database as well.

Various methods may be used to make the comparison of the at least one descriptor to the 3D object-data-model database, and the methods may vary depending on the descriptor received. In one example, the descriptor may include an image of the object. Accordingly, the image may be compared to the 3D object data models in the database. To do so, based on a given 3D object data model of the plurality of 3D object data models in the database, a set of rendered images may be generated that correspond to the given 3D object data model. Then, the set of rendered images may be compared to the descriptor image and, based on the comparison, corresponding 3D object data models from the plurality of (or various) 3D object data models may be determined.

For example, continuing with the category of cameras, a search may be performed using an image of a particular camera with two displays. To compare the image to the database, all of the camera models in the database with two displays may have one or more images rendered that define the camera models. Based on the comparison, various camera models that correspond (or are similar to) the image may be determined. Within the context of this example, a similar model may be a model with two displays that may be located in similar positions as those in the image of the camera.

In some examples, generating the set of rendered images may include determining a number of views based on canonical viewpoints associated with the given category of objects. For example, again referring to an instance in which the category of objects is cameras, the set of rendered images may be based on cannocial views of a camera such as a view that is front facing, a view that is back facing, and a view that is top facing to name a few. Using these views, the relevant models of cameras in the database may have images rendered. Alternatively, generating the set of rendered images may include determining a number of views that are substantially evenly spaced around one of the models. "Substantially even" may refer to exactly even and/or one or more deviations from exactly even that does not significantly impact the spacing around the 3D object data model. Referring to the category of cameras, using the substantially even spaced views, images may be rendered that correspond to the camera model at the respective view.

Additionally, in instances in which the image is the descriptor, the image may include features that describe both the object of interest and other things such as a background, for example. In such instances, before comparing the image to the database, the image may be segmented to segment the object of interest from the image background. This may be done, for example, by processor 112 executing any automatic foreground segmentation algorithm that may identify a single object of interest near the center of the image.

In other examples, the descriptor may include a 3D object data model that describes the object or partial 3D object data model that describes a part of the object. The 3D object data model or partial 3D object data model may be compared to the various 3D object-data-model database using shape and appearance information of the descriptor 3D object data model and shape and appearance information of the various 3D object data models in the database. The shape and appearance information may be obtained in a manner the same as or similar to that discussed above with regard to method 200, for example. Based on the comparison, corresponding 3D object data models from the database may be determined.

Upon comparing the at least one descriptor to the contents of the 3D object data model database, at block 226 method 220 involves based on the comparison, generating a search query result that comprises 3D object data models that describe the object and associated images that describe the object. And at block 228, method 220 involves arranging the 3D object data models and the associated images in the search query result in a manner such that the 3D object data models are moveable inline in the search query result. The search query result may include both 3D object data models that describe the object and associated images that describe the object. For instance, referring to the example noted above in which a search was performed for cameras with two displays, the search query result may return similar 3D object data models (e.g., camera models) with two displays and images with cameras with two displays. In other words, the corresponding 3D object data models determined at block 224 may be included in the search query result.

Additionally, the 3D object data models that describe the object may be included in the search query result in a manner that may allow the 3D object data models to be moveable within the search query result. For example, the 3D object data models may be capable of being rotated, translated, or swiveled inline in the search query result. Other movements may be performed as well. Moveable inline may describe adjusting a view of an object in respective 3D object data models individually inline within the search results, such as within an embedded swivel viewer, for example. In further examples, one or more of the 3D object data models that describe the object may be included in a window pane and moveable within the window pane.

Figure 4C:
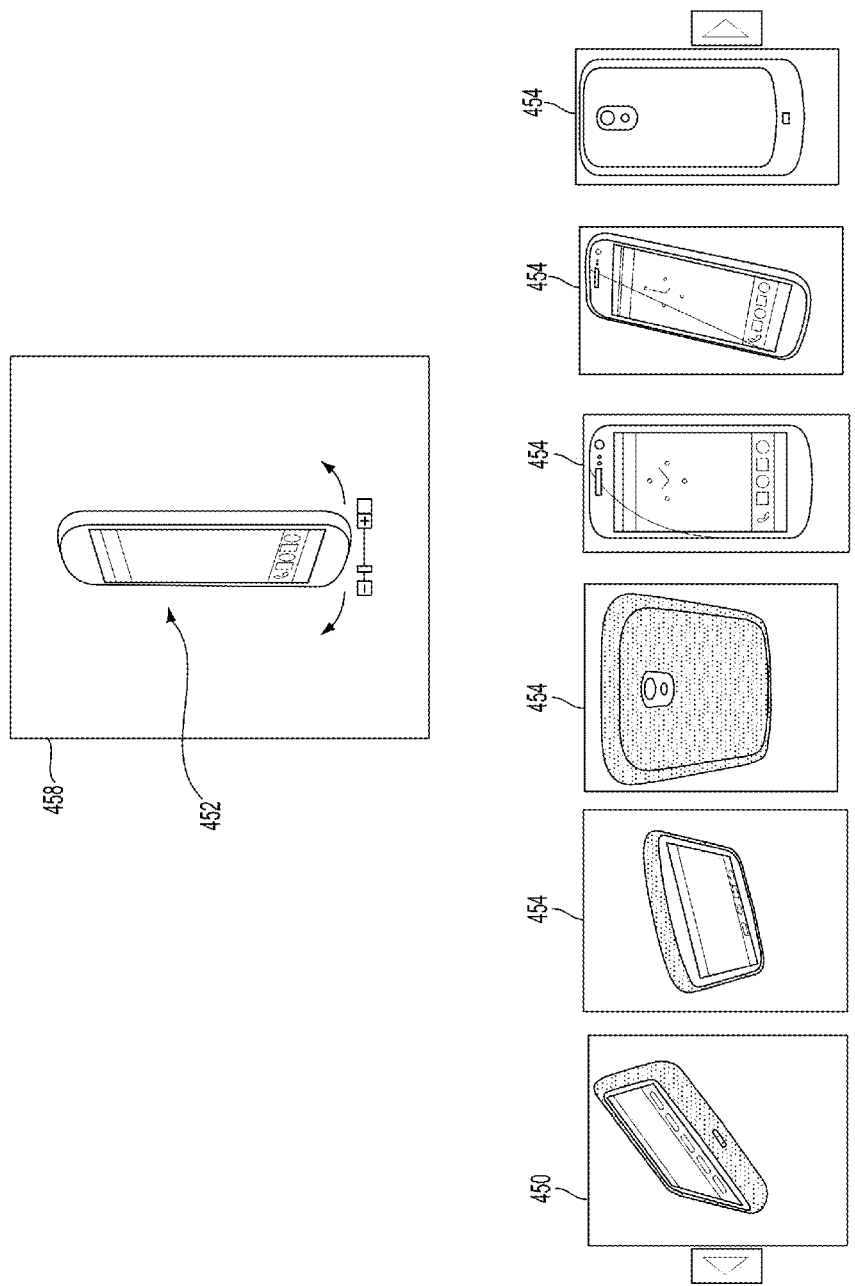
FIG. 4C illustrates an example search result query, according to an example embodiment.

FIG. 4C illustrates an example search result, according to an example embodiment. Within examples, many 3D object data models may be returned for a search result and provided in a layout of rows, for example, as may be returned by a search engine. FIG. 4C illustrates one 3D object data model returned and provided in a search result. In FIG. 4C, the category of objects is a smartphone or smart device. Using method 220 of FIG. 2A, a 3D object-data-model database of smart devices may have been searched using a descriptor 450. In the example of FIG. 4C, the search descriptor may take the form of a rendered image. Based on the search, a search query result may be provided in a manner such that a similar 3D object data model 452 is returned along with multiple images 454 of the 3D object data model. The images 454 may be included in the query result along with the rendered image 450 used to perform the search, and the images 454 may be provided below the 3D object data model. However, in some examples the rendered image 450 used to perform the search may not be part of the query result. The multiple images 454 may be images that depict various views of model 452. Also, as shown in FIG. 4C, 3D object data model 452 may be positioned within a preview pane 458 and may be moveable or rotatable within the preview pane 458, and in further examples, the images 454 may also be included within the preview pane 458 as well and can be selected to move or adjust the model 452 to a view of a given image 454. Thus, the search result may include many 3D object data models and associated images, each included within individual preview panes, and each individually moveable within their respective preview panes.

Moreover, the images 454 may be shown based on a view of the data model 452 the image depicts (e.g., a canonical view) as discussed with reference to method 220 at block 224. Further, in some examples the images 454 and the object data model 454 may be interactable. For instance images 454 may be clickable and, once clicked, may cause object data model 452 to take the view associated with the clicked image.

Once the 3D object data models and associated images have been arranged in the search query result, at block 230, method 220 involves providing by the server the search query result. In some examples, the search query result may be provided to a display similar to or the same as display 560 discussed below with reference to FIG. 5, and in others may be provided to a website.

Additional Example Embodiments

Figure 5:
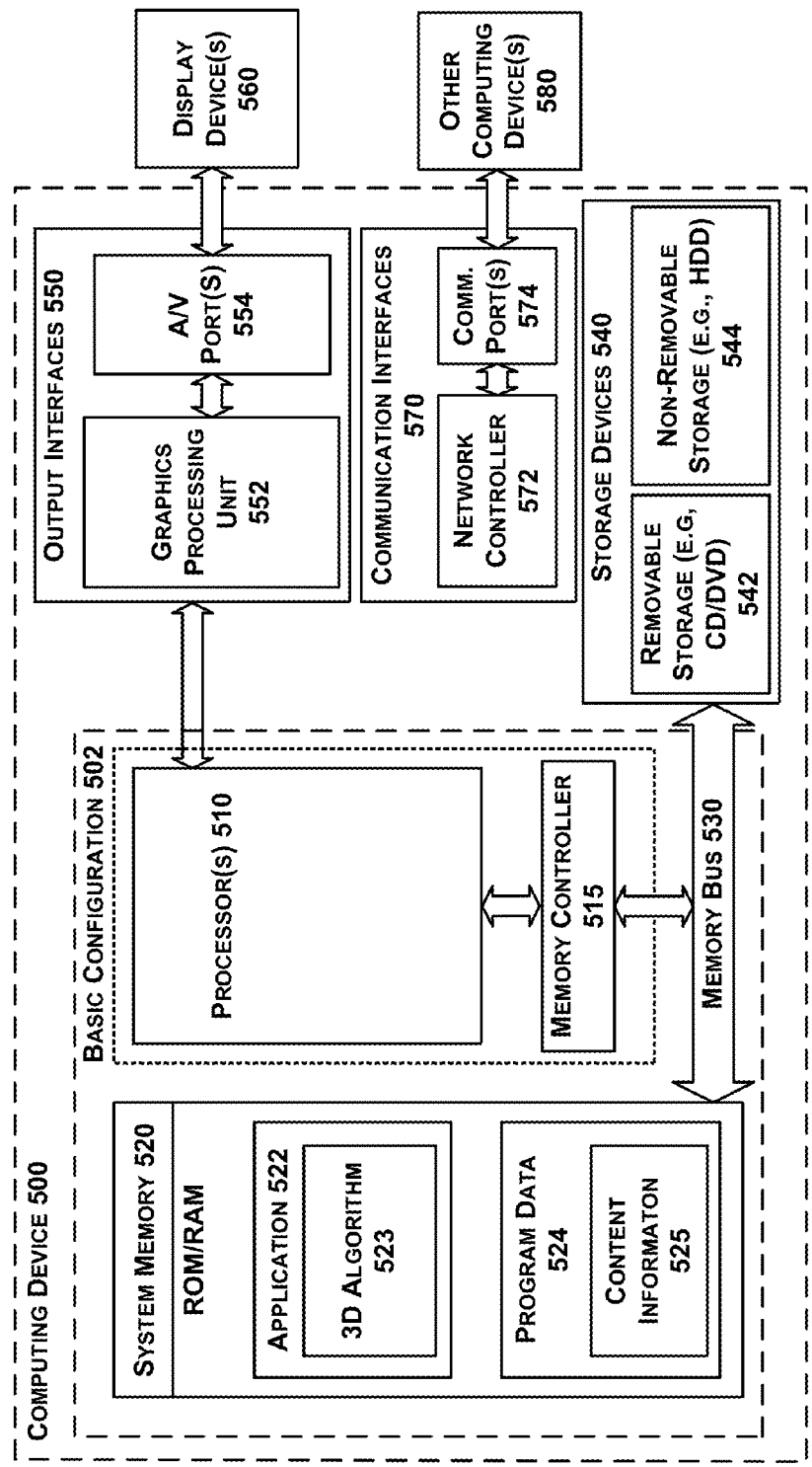
FIG. 5 is a functional block diagram illustrating an example computing device used in a computing system that is arranged in accordance with at least some embodiments described herein, according to an example embodiment.

FIG. 5 is a functional block diagram illustrating an example computing device 500 used in a computing system that is arranged in accordance with at least some embodiments described herein. The computing device 500 may be a personal computer, mobile device, cellular phone, touch-sensitive wristwatch, tablet computer, video game system, or global positioning system, and may be implemented to provide a method for applying annotations for three-dimensional (3D) object data models and/or determining modifications to call-outs for 3D object data models as described in FIGS. 1-4. In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (μP), a microcontroller (μC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include a 3D algorithm 523 that is arranged to provide inputs to the electronic circuits, in accordance with the present disclosure. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include output interfaces 550 that may include a graphics processing unit 552, which can be configured to communicate to various external devices such as display devices 560 or speakers via one or more A/V ports 554 or a communication interface 570. The communication interface 570 may include a network controller 572, which can be arranged to facilitate communications with one or more other computing devices 580 over a network communication via one or more communication ports 574. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 500 can be implemented as a portion of a small-form factor portable (or mobile) electronic device such as a cell phone, a smart phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

Figure 6:
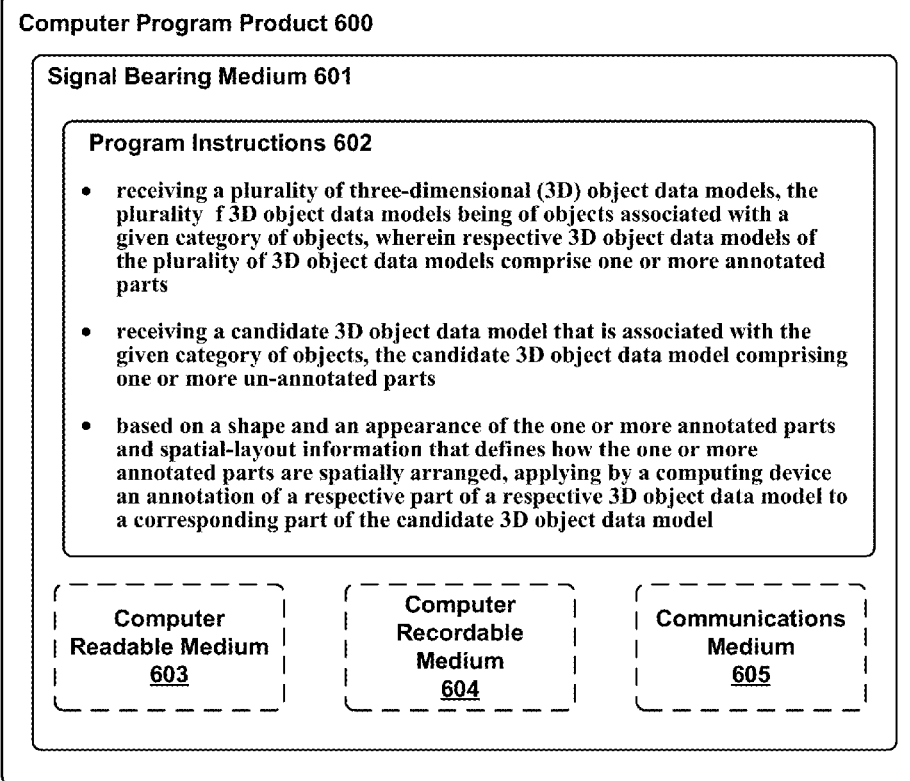
FIG. 6 is a schematic illustrating a conceptual partial view of an example computer program product that includes a computer program for executing a computer process on a computing device, arranged according to at least some embodiments presented herein, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, by one or more computing devices, a search query comprising at least one descriptor for an object, wherein the at least one descriptor comprises an image of the object and wherein the object is associated with a given category of objects;
    comparing, by the one or more computing devices, the at least one descriptor to contents of a three-dimensional (3D) object-data-model database, wherein the contents of the 3D object-data-model database include contents associated with the given category of objects, wherein the 3D object-data-model database further comprises a plurality of 3D object data models that describe the object, and wherein comparing the at least one descriptor to contents of the 3D object-data-model database comprises:
        based on a respective 3D object data model of the plurality of 3D object data models, generating a set of rendered images that correspond to the respective 3D object data model;
        comparing the image to the set of rendered images; and
        based on the comparison of the image to the set of rendered images, determining corresponding 3D object data models from the plurality of 3D object data models, and wherein the 3D object data models that describe the object comprise the corresponding 3D object data models;
    based on the comparison of the at least one descriptor to contents of the 3D object-data-model database, generating, by the one or more computing devices, a search query result that comprises the corresponding 3D object data models retrieved from the 3D object-data-model database that describe the object and associated images that describe the object;
    arranging in the search query result, by the one or more computing devices, the associated images that describe the object, the corresponding 3D object data models, and the image of the object used to perform the search query, wherein the corresponding 3D object data models are arranged in the search query result in a manner such that the corresponding 3D object data models are moveable inline in the search query result; and
    providing, by the one or more computing devices, the search query result.

2. The method of claim 1, wherein the at least one descriptor comprises a second 3D object data model that describes the object, or a partial 3D object data model that describes a portion of the object.

3. The method of claim 1, wherein arranging the corresponding 3D object data models and associated images in the search query result in the manner such that the corresponding 3D object data models are moveable in line in the search query result comprises:
    arranging the corresponding 3D object data models within a preview pane inline in the search query result, wherein the corresponding 3D object data models are individually rotatable within the preview pane.

4. The method of claim 1, wherein providing the search query result comprises providing the search query result to a website.

5. The method of claim 1, wherein generating the set of rendered images of the respective 3D object data model comprises:
    determining a number of views based on canonical viewpoints associated with the given category of objects; and
    for respective views of the number of views, generating respective rendered images that correspond to the respective 3D object data model at the respective views.

6. The method of claim 5, wherein the images that describe the object comprise the respective rendered images.

7. The method of claim 1, wherein generating the set of rendered images of the respective 3D object data model comprises:
    determining a number of views that are substantially evenly spaced around the respective 3D object data model; and
    for respective views of the number of views, generating respective rendered images that correspond to the respective 3D object data model at the respective views.

8. The method of claim 7, wherein the images that describe the object comprises the respective rendered images.

9. The method of claim 1,
    wherein the at least one descriptor comprises a second 3D object data model that describes the object, wherein the 3D object-data-model database further comprises a plurality of 3D object data models that describe the object,
    wherein comparing the 3D image descriptor to the 3D object-data-model database comprises:
    comparing shape and appearance information of the second 3D object data model to the plurality of 3D object data models; and
    based on the comparison of shape and appearance information of the second 3D object data model to the plurality of 3D object data models, determining the corresponding 3D object data models from the plurality of 3D object data models, and
        wherein the 3D object data models that describe the object comprise the corresponding 3D object data models.

10. The method of claim 1,
    wherein the at least one descriptor comprises a partial 3D object data model that describes a portion of the object, wherein the 3D object-data-model database comprises a plurality of 3D object data models that describe the object,
    wherein comparing the 3D image descriptor to the 3D object-data-model database comprises:
    comparing shape and appearance information of the partial 3D object data model to the plurality of 3D object data models; and
    based on the comparison of shape and appearance information of the partial 3D object data model to the plurality of 3D object data models, determining the corresponding 3D object data models from the plurality of 3D object data models, and wherein the 3D object data models that describe the object comprise the corresponding 3D object data models.

11. A server comprising:

one or more computing devices;

a non-transitory computer readable medium; and instructions stored in the non-transitory computer readable medium, the instructions executable by the one or more computing devices to cause the server to perform functions comprising:

receiving a search query comprising at least one descriptor for an object, wherein the at least one descriptor comprises an image of the object and wherein the object is associated with a given category of objects;

comparing the at least one descriptor to contents of a three-dimensional (3D) object-data-model database, wherein the contents of the 3D object-data-model database include contents associated with the given category of objects, wherein the 3D object-data-model database further comprises a plurality of 3D object data models that describe the object, and wherein comparing the at least one descriptor to contents of the 3D object-data-model database comprises:

based on a respective 3D object data model of the plurality of 3D object data models, generating a set of rendered images that correspond to the respective 3D object data model;

comparing the image to the set of rendered images; and based on the comparison of the image to the set of rendered images, determining corresponding 3D object data models from the plurality of 3D object data models, and wherein the 3D object data models that describe the object comprise the corresponding 3D object data models;

based on the comparison of the at least one descriptor to contents of the 3D object-data-model database, generating a search query result that comprises the corresponding 3D object data models retrieved from the 3D object-data model database that describe the object and associated images that describe the object;

arranging in the search query result the associated images that describe the object, the corresponding 3D object data models, and the image of the object used to perform the search query, wherein the corresponding 3D object data models are arranged in the search query result in a manner such that the corresponding 3D object data models are moveable inline in the search query result; and providing the search query result.

12. The server of claim 11, wherein the instructions are further executable by the processor to cause the server to perform functions comprising:

determining a number of views based on canonical viewpoints associated with the given category of objects; and for respective views of the number of views, generating respective rendered images that correspond to the respective 3D object data model at the respective views.

13. The server of claim 11, wherein the instructions are further executable by the processor to cause the server to perform functions comprising:

determining a number of views that are substantially evenly spaced around the respective 3D object data model; and for respective views of the number of views, generating respective rendered images that correspond to the respective 3D object data model at the respective views.

14. The server of claim 11, wherein the at least one descriptor comprises a second 3D object data model that describes the object, wherein the 3D object-data-model database comprises a plurality of 3D object data models that describe the object, and wherein the instructions are further executable by the processor to cause the server to perform functions comprising:

comparing shape and appearance information of the second 3D object data model to the plurality of 3D object data models; and based on the comparison of shape and appearance information of the second 3D object data model to the plurality of 3D object data models, determining the corresponding 3D object data models from the plurality of 3D object data models, and wherein the 3D object data models that describe the object comprise the corresponding 3D object data models.

15. The server of claim 11, wherein the at least one descriptor comprises a partial 3D object data model that describes a portion of the object, wherein the 3D object-data-model database comprises a plurality of 3D object data models that describe the object, and wherein the instructions are further executable by the processor to cause the server to perform functions comprising:

comparing shape and appearance information of the partial 3D object data model to the plurality of 3D object data models; and based on the comparison of shape and appearance information of the partial 3D object data model to the plurality of 3D object data models, determining the corresponding 3D object data models from the plurality of 3D object data models, and wherein the 3D object data models that describe the object comprise the corresponding 3D object data models.

16. A non-transitory computer readable medium having stored therein instructions, that when executed by a computer system, cause the computer system to perform functions comprising:

receiving a search query comprising at least one descriptor for an object, wherein the at least one descriptor comprises an image of the object and wherein the object is associated with a given category of objects;

comparing the at least one descriptor to contents of a three-dimensional (3D) object-data-model database, wherein the contents of the 3D object-data-model database include contents associated with the given category of objects, wherein the 3D object-data-model database further comprises a plurality of 3D object data models that describe the object, and wherein comparing the at least one descriptor to contents of the 3D object-data-model database comprises:

based on a respective 3D object data model of the plurality of 3D object data models, generating a set of rendered images that correspond to the respective 3D object data model;

comparing the image to the set of rendered images; and based on the comparison of the image to the set of rendered images, determining corresponding 3D object data models from the plurality of 3D object data models, and wherein the 3D object data models that describe the object comprise the corresponding 3D object data models;

based on the comparison of the at least one descriptor to contents of the 3D object-data-model database, generating a search query result that comprises the corresponding 3D object data models retrieved from the 3D object-data model database that describe the object and associated images that describe the object;

arranging in the search query result the associated images that describe the object, the corresponding 3D object data models, and the image of the object used to perform the search query, wherein the corresponding 3D object data models are arranged in the search query result in a manner such that the corresponding 3D object data models are moveable inline in the search query result; and providing the search query result.

17. The non-transitory computer readable medium of claim 16, wherein the at least one descriptor comprises a second 3D object data model that describes the object, wherein the 3D object-data-model database comprises a plurality of 3D object data models that describe the object, wherein the instructions are further executable by the computer system to cause computer system to perform functions comprising:

comparing shape and appearance information of the second 3D object data model to the plurality of 3D object data models; and based on the comparison of shape and appearance information of the second 3D object data model to the plurality of 3D object data models, determining the corresponding 3D object data models from the plurality of 3D object data models, and wherein the 3D object data models that describe the object comprise the corresponding 3D object data models.

18. The method of claim 1, further comprising:

receiving a selection of one of the associated images in the search query result; and adjusting the corresponding 3D object data models to a view associated with the selection of one of the associated images.

\* \* \* \* \*